Dec. 15, 1970  R. J. STEFANIAK ET AL  3,546,747
MOLD CARRIER
Filed Oct. 7, 1968  2 Sheets-Sheet 1
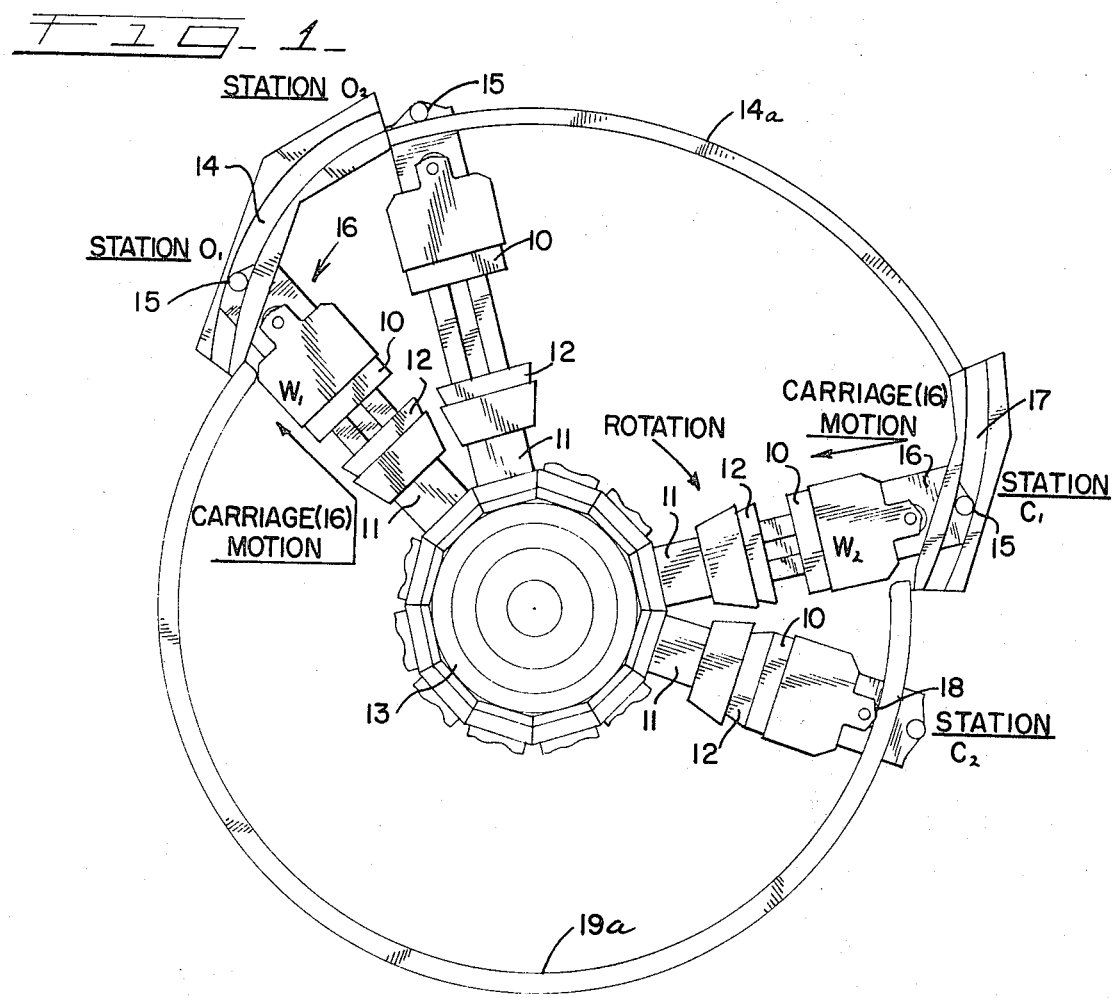
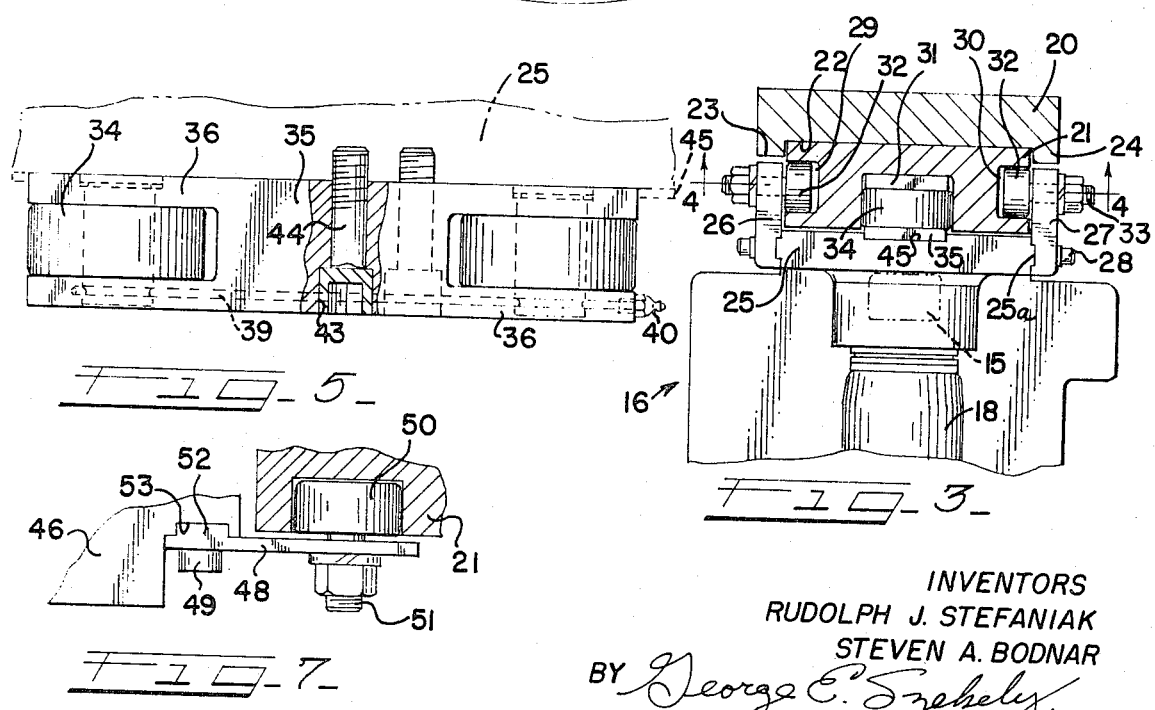
INVENTORS
RUDOLPH J. STEFANIAK
STEVEN A. BODNAR
BY George E. Szekely
ATT'Y.

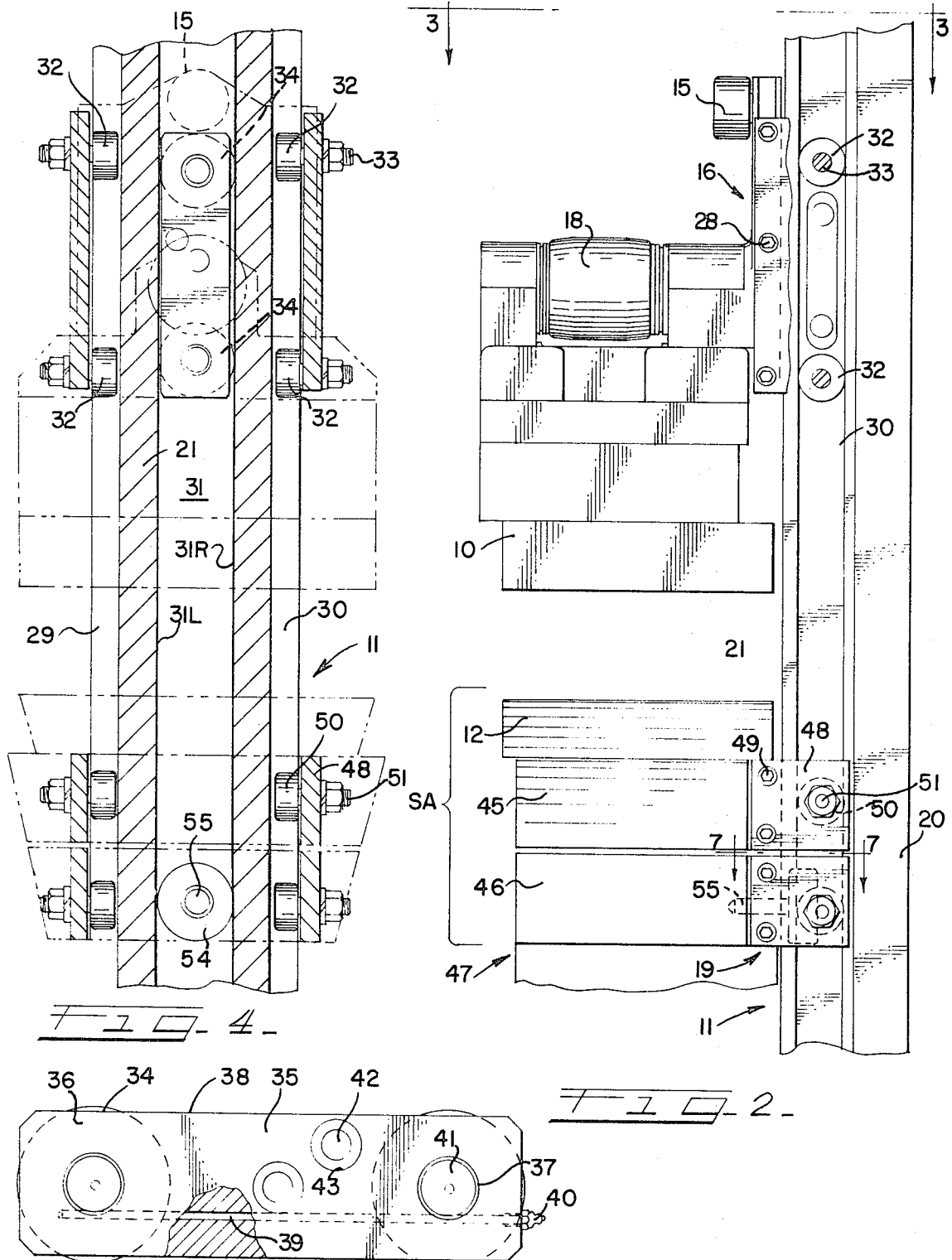

3,546,747
MOLD CARRIER
Rudolph J. Stefaniak, Munster, Ind., and Steven A. Bodnar, Harwood Heights, Ill., assignors to Continental Can Company, Inc., New York, N.Y., a corporation of New York
Filed Oct. 7, 1968, Ser. No. 765,330
Int. Cl. B29c 5/10
U.S. Cl. 18—20                                    9 Claims

ABSTRACT OF THE DISCLOSURE

A carriage for the mobile half of a blow mold in a rotary blow mold machine. The carriage consists essentially of a rolling cage running on gibs. Carriage wheels take load radially in two recilinear planes. The axles of one wheel set are transverse to the plane of the mold wheel. The axles of the other set are parallel to the wheel plane. The carriage wheels run in channels, accepting load in either direction in the plane of the load, running clearance being minimal. The fixed mold half is supported upon the same gibs as the mobile half by means of a similar wheel arrangement for accurate alignment, together with ease of installation and adjustment.

BACKGROUND OF THE INVENTION

Field of the invention

This invention relates to mold carrier structures, particularly for the support of molds on the arms of a vertical-rotary blow-molding machine. In such machines, the molds are carried on arms of a spider, the molding cycle generally being completed in one revolution of the mold wheel. One half of the mold, usually the outer half, is movable along the arm to open and close the mold at appropriate stages, as determined by a radial cam ring. A machine of this type is used for molding hollow plastic articles, such as bottles and jugs, in a wide range of sizes involving use of a corresponding range of mold sizes, preferably to be run on the same basic machine. The arm and carriage structure which is the subject of the invention generally constitutes part of the basic machine, being designed interchangeably to receive various sets of molds, adapters, and other appurtenances for different articles.

The prior art

Molding of acceptable articles requires consistently true matching of the mold halves. Such satisfactory alignment has not been readily obtainable in prior automatic machines, in large part because of deficiencies in the mold carrier structure and arrangement.

In machines prior to this invention, mold arms or carriers have been provided with carriage slides of various types. One such arrangement involves using a pair of rods yoked at the outer and inner ends, the mold carriage being equipped with sleeve bearings. Such an arrangement has not proved entirely satisfactory, particularly in large vertical rotary machines.

In the vertical-rotary blow-molding machine, the molds revolve in a vertical plane, one half of each mold moving radially along the arm as the mold wheel revolves. The moving half-mold assembly for a large article weighs several hundred pounds, the weight shifting along and angularly of the slide axis as the wheel rotates. Furthermore, facility for loading and unloading the mold and other operating conditions require that the mold assembly be cantilevered from the slide. Even with the largest rods which space limitations will permit and the greatest care in manufacture and maintenance, the severe bending loads, coupled with the substantial, complex dynamic loads, produce such slide-arm deflection as to cause binding, misalignment and excessive wear, with corresponding frequency of shut-down, high cost of maintenance and frequently unsatisfactory operation of the machine.

SUMMARY OF THE INVENTION

It is an object of this invention to provide a rolling carriage and mounting therefor which will safely support and accurately position a moving mold assembly under variable support load conditions.

It is a more particular object of this invention to provide rolling carriages for the movable mold parts in a vertical-rotary blow-molding machine which so distribute the load upon the carriage and the support structures as to minimize play and strain of the parts, thereby to assure consistent mold alignment and freedom from drag and binding effects.

The objects of the invention are achieved by supporting the moving mold half on wheels, which may be ball or roller bearing machine units, or the like. The mold carriage includes a cage embracing a gib block which extends along the mold carrier arm. The gib tracks consist of a center channel and two side channels. The axles for the wheels running in the center channel have their center lines in the plane common to the mold and arm center lines. The wheels running in the side tracks have their axles in the plane at right angles to the plane of the center wheel axles.

The channels are a close running fit on the wheels, so that radial load is borne in either direction with negligible play. The center wheels are selected for high radial load capacity and constitute the main load wheels, bearing that component of the weight of the mold carriage assembly which is transverse to the arm, being maximum when the arm is horizontal. This load is taken on the gib along its major section axis, the depth of the gib block in this direction being such that it absorbs the load without significant flexure. The wheels are spaced well apart, thereby distributing the load and substantially eliminating cocking due to running clearance and wear. The loads due to cantilevering of the mold half assembly upon the gibs are taken as radial loads on the two pairs of side wheels, which also effect a reaction couple against twist, the arm of the reaction couple being along the major axis of the gib section.

The inner, fixed mold half is positioned and supported along the inner end of the gib block in a manner similar to that for the moving half, the channel tracks constituting a reference common to both halves of the mold, thus initially establishing alignment of the halves. The wheeled carriage for the inner mold half also facilitates positioning the inner mold assembly when adjusting molds, or when changing from one size to another, as required to establish the parting plane at the correct position along the arm.

The distribution of static and dynamic loads affecting the moving carriage in two planes upon a single gib block of substantial section minimizes incidence of misalignment due to assembly error, distortion or wear. The combination of freedom from distortion and full rolling support substantially precludes binding or sticking of the carriage and consequent overloading of the cam, opening and closing followers, brackets and other parts of the machine.

The foregoing and other objects, advantages and details of the invention will be best understood from the ensuing description, read with the accompanying drawings.

BRIEF DESCRIPTION OF THE DRAWINGS

FIG. 1 is a schematic front elevation of a mold wheel and cam assembly in a vertical rotary molding machine, showing several arms with the mold carriage and mounting structures of this invention;

FIG. 2 is a partial side elevation of one arm of the mold wheel shown in FIG. 1, with the outer mold half in open-mold position;

FIG. 3 is a transverse section of the mold arm shown in FIG. 2, taken at a position above the outer mold carriage on line 3—3 of FIG. 2;

FIG. 4 is a longitudinal section through the arm of FIGS. 2 and 3, taken on line 4—4 of FIG. 3;

FIG. 5 is a side view of the main load wheel carrier;

FIG. 6 is a plan view of the main load wheel carrier; and

FIG. 7 is a fragmentary section of the inner mold carrier taken on line 7—7 of FIG. 2.

DESCRIPTION OF THE PREFERRED EMBODIMENT

FIG. 1 shows a multi-station wheel arranged to revolve in the direction of the rotation arrow. Arms 11 are carried with wheel 13, arms 11 in turn supporting outer mold halves 10 and inner mold halves 12 in radial alignment. For the purposes of this description, arms 11 are shown in their full extent only at positions or stations in stages representing the most critical mold support load conditions. Arms 11 at other stations are broken away.

Outer mold halves 10 move radially in and out along arms 11 from and to their associated inner mold halves 12, which are fixed to arms 11. When arm 11 passes station $O_1$, outer half 10 is moving radially outward along arm 11, under control of opening transition cam track 14, acting on follower 15, which is held by the mold carriage 16. At station $O_2$, mold 10 has reached substantially its full open position, which is maintained as follower 15 traverses the hold-open track 14a. As each arm 11 passes station $C_1$, the associated mold half 10 is moving radially inward along arm 11, under control of follower 15, traversing the closing transition track 17. At station $C_2$, the mold 10–12 is closed and so held by virtue of follower 18 traversing the hold-closed track 19a in return transit to station $O_1$.

From inspection of FIG. 1, and therewith considering operation of the machine as generally described, it will be apparent that arm 11 is subjected to a complex of variable and shifting loads, particularly by virtue of the opening and closing movements of the carriage 16 in the transition traverses along tracks 14 and 17. During these traverses the bending load imposed on arm 11 is at or near maximum, coincident with stages of maximal dynamic loading. Further, various indeterminate shock and vibration loads will often be superimposed upon the more readily determinable static and dynamic loads. Such transient or extrinsic loads include those due to start and stop, wheel imbalance, mold closing slam, parison introduction, article knockout, sympathetic drive and transmission vibration, and the like. Consistent mold matching and smooth opening and closing are dependent on maintaining true support and guidance upon arm 11 under all operating conditions. Manifestly, considerations of economy preclude resort to massive or highly complex construction, particularly considering the desirability of incorporating as many mold units as possible in a compact machine.

FIG. 2 illustrates the general arrangement upon arm 11 of the mold halves 10 and 12, with their carriages 16 and 19. Arm 11 comprises a back plate 20 and a gib block 21, which may be fastened to backplate 20 in any suitable manner, as by bolts or cap screws (not shown). Referring now to FIGS. 3 and 4, in association with FIG. 2, the inner face 22 of backplate 20 is finished to provide a truly flat bed for gib block 21, the lips 23, 24, holding block 21 axially true, radially of arm 11. The edges of follower bracket 25 are keyed to the inner faces of side brackets 26, 27, which are fastened in position by means of several cap screws 28. Thus, brackets 25, 26, and 27, when assembled and positioned as in FIG. 3, constitute with backplate 20 a cage about the gib block 21, the bracket asembly being a close, but free, fit on block 21. The bracket parts are dimensioned to assure positive clearances between the several inner faces of the edges thereof and the opposed edges or faces of block 21 and lips 23, 24, fairly close clearances being provided primarily for assembly guidance.

Carriage 16 is supported and guided by wheels running in gib tracks. The tracks consist of three channels, side channels 29 and 30, opposing brackets 26 and 27 respectively, and center channel 31, opposing bracket 25. Left and right side wheels 32 run in side channels 29 and 30 respectively. Wheels 32 are carried on brackets 26 and 27 by means of stud shafts 33, there being a pair of wheels 32 in each channel 29, 30, spaced a substantial distance apart, lengthwise of block 21. A pair of center wheels 34 fit closely in the center channel 31. Wheels 34 are spaced about the same distance radially of arm 11 as side wheels 32, with the upper and lower axes of side and center wheels respectively in substantially common planes, but with the axes of the center wheels 34 at right angles to the axes of side wheels 32.

The principal load due to the substantial weight of carriage 16 is borne radially of center wheels 34 in the plane of those wheels. Therefore, it is desirable to provide trunnion support for wheels 34, the arrangement shown in FIGS. 5 and 6. An elongated carrier 35 is provided with pairs of bracket arms 36 at opposite ends, defining yokes for wheels 34, whose diameters are slightly greater than the width of carrier 35. Arms 36 are bored through to receive wheel bearing bushings 37, whose axes lie in the longitudinal center plane of carrier 35, so that the rims of wheels 34 extend beyond bracket 3 at both sides. Provision is made for greasing the wheel bearings from time to time through a grease passage 39, lengthwise of the carrier 35, communicating with bearing bushings 37, and equipped at one end with a suitable grease fitting 40. Bushings 37 are journalled on shafts 41.

Through bores 42 accommodate cap screws 44, parallel to shafts 41, whereby carrier 35 may be clamped to carriage bracket 25. As best seen in FIG. 3, bracket 25 has a shallow groove 45 lengthwise of its inner face, positioned to oppose gib center channel 31, the carrier 35 being tenoned in groove 45. As best seen in FIG. 5, cap screws 44 are of the flush, hollow-head type, arranged with heads fully recessed in counter-bores 43. Thus, no screw head clearance is required in the channel 31 (FIG. 3), thereby conserving depth of the gib block 21.

Referring again to FIG. 1, maximum direct load transverse to arm 11, due to carriage weight W, occurs when arm 11 passes through its horizontal position, as between stations $C_1$ and $C_2$. As seen from FIG. 4, this tranverse load is borne on center wheels 34, which roll on either side wall of channel 31. When mold 10–12 is in its closing traverse, as at station $C_1$ (FIG. 1), the gravity load W is taken as a rolling load along the right side wall 31R of channel 31 (FIG. 4). When mold 10–12 passes through its opening traverse, as at station $O_1$, the traverse component $W_T$ is borne as rolling load on the left side wall 31L. Since the carriage rolling speed is relatively low, it is feasible to maintain virtually microscopic running clearance of wheels 34 between side walls 31R and 31L, so that side to side load shift occurs substantially without sensible physical shift of the carriage 16. The spacing of wheels 34 precludes cocking of the carriage in the mold wheel plane. Similarly, the spacing of wheels 32 along side channels 29 and 30 precludes cocking in the plane transverse to the mold wheel plane, while the four-point bidirectional restraint precludes twist displacement of carriage 16 relative to gib block 21. The full rolling contact precludes binding or drag during the opening and closing traverses.

Certain dynamic loads may act upon carriage 16 in the direction opposite to that of the gravitational component. Such dynamic loads include those due to inertia, shock and vibration. To the extent that such loads are transient, or otherwise out of phase with the cycling gravitation load component, resultant load shift may occur while the carriage 16 is in rolling motion during the opening or closing traverse. For example, as arm 11 traverses track 14 between stations $O_1$ and $O_2$, load components $W_T$ is decreasing to a low value at $O_2$. Upon deceleration or braking of wheel 13, the inertial effect on carriage 16 may be sufficient to shift the load resultant from left to right, while carriage 16 continues to roll radially outward along arm 11. Such load shift is readily accommodated without binding, by reversal of rotation of the wheels 34, or one of them, according to the distribution of load between the wheels 34.

As best seen in FIG. 2, carriage 16 is outboard of gib block 21, and the carriage center of gravity is somewhat forward of opening follower 15. Referring to FIG. 1, it will be seen that during the open mold traverse of arm 11 from station $O_1$ toward closed condition at station $C_2$, the weight of carriage 16 is supported in varying proportions by track 14–14a–17 and arm 11. These support conditions set up two load component couples, one in a radial plane on an arm between the carriage 16 and follower 15, and one transverse to arm 11, on an arm between carriage 16 and wheels 34. Referring to FIGS. 2, 3, and 4, it will be seen that the four wheels 32, closely confined in side channels 29 and 30, provide a reaction couple system which precludes carriage 16 rocking under the effect of the load couples. Wheels 32 at left and right of arm 11 establish a transverse reaction couple, while a radial reaction couple subsists on an arm between outer and inner pairs.

The radial couple component varies from zero at horizontal arm position to maximum value when arm 11 is vertical. The value of the transverse couple varies conversely, 90° out of phase with the radial couple component. There is also a reversal in the direction of the transverse reaction couple as the arm 11 passes over upright center. As a consequence of the load variation and shift, there is an accompanying variation and shift load on individual ones of wheels 32. The value and direction of the carriage wheel load resultants are also affected by additive or subtractive dynamic loads of the character previously noted. Accordingly, shift in resultant load direction on a particular wheel 32 may occur as carriage 16 is in rolling motion, as for example, between stations $O_1$ and $O_2$. In such case, the wheel 32 thus affected merely reverses its direction of rotation, as previously observed in reference to wheels 34. In any case, the close running fit of wheels 32 in channel 29 and 30 and the substantial transverse and radial wheel spacing preclude sensible shift of carriage 16 relative to gib block 21, upon incidence of the load variations and shift described. The substantial spans between the several wheels 32 also minimize wheel bearing loads on the walls of channel 31, while the generous section of gib block 21 readily absorbs the bending and twisting effects of the reaction load couples without injurious strain. Thus, true positioning and guidance of carriage 16 can be maintained substantially free from the effects of strain or wear.

Referring again to FIG. 1, as arm 11 traverses the hold-closed cam track 19a, the radial weight component is borne on the follower 18, together with the reaction to mold closing force. As seen in FIG. 2, follower 18 is so positioned directly over mold half 10 and the mass center of carriage 16 that there is virtually no load support couple in the radial plane. However, the wheels 32 and 34 sustain the other load components in the manner and for the purposes substantially as previously described, whereby to preclude shift of carriage 16 and consequent shear along the interface between mold halves 10 and 12.

In a molding machine of the type shown in FIG. 1, inner mold half 12 is fixed on arm 11 during molding operation. However, for the purpose of set-up, adjustment, mold changes, and the like, the inner mold half 12 is desirably movable along arm 11, whereby to accommodate mold assemblies of different radial depth, to facilitate setting for proper holding pressure and otherwise to adapt the machine for universal operation with a minimum of changeover parts and labor. These purposes are effected according to this invention by means of an inner mold carrier and support structure somewhat similar to that for the movable half.

As best seen in FIG. 2, the inner mold assembly consists essentially of the inner mold half 12, support blocks 45 and 46, and an adapter-spacer assembly indicated generally by the reference numeral 47. In the example shown, the sub-assembly of mold 12 and blocks 45, 46, designated SA, will generally be handled as a unit. In addition to auxiliary functions not involved here, blocks 45 and 46 constitute a carriage for mold 12, and for this purpose are provided with four brackets 48, a right and left pair for each block. Cap screws 49 fasten the brackets 48 to the sides of blocks 45 and 46.

Referring to FIG. 4 in association with FIG. 2, each bracket 48 carries a wheel 50 on a stub shaft 51, outboard of blocks 45 and 46. Thus, blocks 45 and 46, with brackets 48 and wheels 50, constitute a rolling carriage for lower mold half 12, generally similar to carriage 16 for upper mold half 10. Wheels 50 run in side channels 29 and 30, positioning mold half 12 depthwise of arm 11, obviating rocking actions of sub-assembly SA during set-up, adjustment and removal operations, and providing an anti-friction guide during such operations. Since these operations are normally preformed with arm 11 upright, the only load on wheels 50 is an occasional and transient one, as may occur due to the possible unbalanced support of sub-assembly SA when lowering on to the spacer-adapter unit 47. Once mold 12 is set and adjusted for precision alignment with mold half 10, the sub-assembly SA is locked together and to the fixed spacer-adapter assembly 47 in any suitable manner. Unit 47 thereafter holds and supports sub-assembly SA during molding operation. Consequently, wheels 50 need not be spaced as widely along arm 11 as may be necessary for the outer half side wheels 32, the spacing of wheels 50 being such as is sufficient to preclude cocking of the inner half sub-assembly during set-up and to establish basic alignment of inner mold 12 with outer mold half 10.

In order to assure true alignment, squareness and freedom of play of the several parts, brackets 48 are preferably keyed to blocks 45 and 46 along vertical lines. A suitable arrangement for this purpose is shown in FIG. 7. Tongue 52, on the inner face of bracket 48, closely engages the mating groove 53, which latter is machined in the rearward side wall of block 45. The other brackets 48 are similarly mounted.

For reasons above given in reference to side wheels 50, the requirements of center guidance of inner mold half 12 are not as exacting as prevail in relation to the moving outer mold half 10. Referring again to FIGS. 2 and 4, a single center wheel 54 is carried on block 46 in position to run along center channel 31. In this location, wheel 54 acts as a centering pilot, when lowering sub-assembly SA onto the fixed support 47. Wheel 54 is journalled on stub shaft 55, which extends rearwardly from block 46.

Since side wheels 50 and center wheel 54 position inner mold half 12 from the same gib channels 29, 30, and 31, which serve for precision positioning and guidance of the outer mold half 10, precision alignment of mold halves 10 and 12 is facilitated in set-up and maintained in molding operations, minimizing the extent of manipulation, gauging, proving runs, adjustment and readjustment. This facility of mold alignment and maintenance thereof not only effects substantial economies in machine set-up and operating costs, but constitutes a significant factor in consistent high quality of the molded articles.

A preferred embodiment of the invention in a vertical rotary blow molding machine has been shown and described by way of example. It will be understood that the

What is claimed is:

1. Carrier apparatus for a mold, said mold having first and second parts, said first part being linearly movable relative to said second part for opening and closing said mold, said apparatus comprising: a gib block having a pair of opposite side channels and a central channel between said side channels, all said channels being parallel to the same major axis of said block; a carriage for said first mold part; and a plurality of wheels mounted on axles carried by said carriage, including first and second wheels arranged for rolling engagement with said gib block, a tandem pair of said first wheels bearing in said center channel, one tandem pair of said second wheels bearing in one of said side channels, and another tandem pair of said second wheels bearing in the other of said side channels, the axles of said first wheels being at right angles to axles of said second wheels, whereby loads incident upon said carriage in any direction transverse to said axis are sustained by said wheels bearing in said channels in planes of said wheels.

2. Carrier apparatus according to claim 1, wherein said channels closely fit respective ones of said wheels diametrally thereof, whereby to sustain said loads in either of opposite directions in the respective planes of said wheels and to establish load couples between various ones of said wheels, said couples being reactant to load moments acting upon said carriage, without substantial bodily movement of said carriage in any direction transverse to said axis.

3. Carrier apparatus according to claim 2, wherein said gib block extends along said second mold part, said second mold part carrying a plurality of guide wheels, at least one of said guide wheels being a close rolling fit in each respective one of said channels, whereby adjustably to position said second mold part upon the line of movement of said first mold part along said gib block.

4. In a vertical rotary molding machine having a rotatable mold wheel with a plurality of radial arms and molds carried on said arms, each said mold including an inner half normally fixed upon said arm and an outer half upon a carriage movable along said arm for opening and closing said mold, the combination of: a gib block affixed to and extending along each said arm, said gib block having a plurality of channels radially of said mold wheel; and a plurality of carriage wheels on axles carried by said carriage in positions for rolling engagement of said carriage wheels in said channels, certain ones of said carriage wheels bearing in a respective one of each said channel, some of said axles being substantially at right angles to others of said axles, whereby carriage loads imposed radially of said carriage wheels and borne upon said channels are distributed in directions along substantially rectangular co-ordinates.

5. In a vertical rotary molding machine, the combination according to claim 4, wherein said molds overhang said arms axially of said mold wheel, said carriage loads comprising a direct weight component and moments incident to said overhang, said channels including a pair of side channels on opposite sides of said gib block and a central channel between said side channels, a first pair of said carriage wheels bearing in tandem upon said central channel, each one of second pairs of said carriage wheels bearing in tandem upon one of said side channels, the axles of said first carriage wheels being at right angles to the plane of said mold wheel, and the axles of said second carriage wheels being parallel to the plane of said mold wheel, whereby said first carriage wheels bear said direct load component in said central channel and said second carriage wheels establish couples reacting in said side channels against said moments, as said carriage rolls along said arm during rotation of said mold wheel.

6. In a vertical rotary molding machine, the combination according to claim 5, wherein said carriage wheels are diametrally closely fitted in respective ones of said channels, whereby said carriage wheels transmit loads bearing upon said channels in either one of opposite directions in any plane of said bearing loads without substantial bodily movement of said carriage relative to said gib block consequential to variations in direction or hand of said carriage loads.

7. In a vertical rotary molding machine, the combination according to claim 6, further including a backplate on said arm, said backplate having flanges extending axially of said mold wheel, said gib block being held closely between said flanges, brackets affixed to said carriage extending across said side channels toward said flanges, said brackets carrying said second wheels, and a carrier affixed to said carriage, said carrier riding in said central channel, said first wheels being trunnioned in said carrier.

8. In a vertical rotary molding machine, the combination according to claim 7, further including a first guide wheel carried with said inner mold half, said first guide wheel having a close rolling fit in said central channel, and a plurality of second guide wheels carried with said inner mold half, said second guide wheels having close rolling fits in said side channels, whereby said inner mold half is adjustable along said arm in alignment with said outer mold half.

9. In a vertical rotary molding machine, the combination according to claim 8, wherein said second guide wheels include a tandem pair in each of said side channels, the axles of said second guide wheel pairs being parallel to the plane of said mold wheel, whereby said pairs establish load bearing couples reacting in said side channels against load moments consequential to overhand of said inner mold half upon said arm.

References Cited

UNITED STATES PATENTS

| | | | |
|---|---|---|---|
| 2,784,452 | 3/1957 | Ruekberg et al. | 18—5 |
| 3,251,673 | 5/1966 | Brymer, Jr. | 65—359 |

H. A. KILBY, JR., Primary Examiner

U.S. Cl. X.R.

65—264, 359; 308—6